United States Patent [19]

Bricker et al.

[11] Patent Number: 5,482,910
[45] Date of Patent: Jan. 9, 1996

[54] PROCESS FOR PREPARING A HYDROCARBON CONVERSION CATALYST

[75] Inventors: Maureen L. Bricker, Buffalo Grove; Thomas K. McBride, Jr., Arlington Heights; Karl Z. Steigleder, Glen Ellyn, all of Ill.

[73] Assignee: UOP, Des Plaines, Ill.

[21] Appl. No.: 270,351

[22] Filed: Jul. 5, 1994

[51] Int. Cl.$^6$ .................................................. B01J 23/00
[52] U.S. Cl. .......................... 502/300; 502/325; 502/326; 502/328; 502/330
[58] Field of Search ............................ 502/300, 325, 502/326, 328, 330

[56] References Cited

U.S. PATENT DOCUMENTS

| | | | |
|---|---|---|---|
| 2,620,314 | 12/1952 | Hoekstra | 252/448 |
| 4,719,196 | 1/1988 | Vogt et al. | 502/304 |
| 4,914,075 | 4/1990 | Bricker et al. | 302/330 |
| 5,017,543 | 5/1991 | De Clippeleir et al. | 502/330 X |
| 5,258,348 | 11/1993 | Van Buren et al. | 502/330 X |
| 5,358,920 | 10/1994 | Ma et al. | 502/330 |

*Primary Examiner*—Michael Lusignan
*Attorney, Agent, or Firm*—Thomas K. McBride; Eugene I. Snyder; Frank S. Molinaro

[57] ABSTRACT

A process for preparing catalysts has been developed. The process involves the use of a chelating ligand such as ethylenediaminetetraacetic acid. The aqueous solution of the chelating ligand and a promoter metal salt is first prepared heated to a temperature of about 80° C. to about its boiling point and then combined with an aqueous solution containing a Group VIII metal compound. Next this mixed solution is aged at a temperature of about 40° C. to about 100° C. and then used to impregnate a support, e.g., alumina spheres. The impregnated support is then dried, calcined and reduced with hydrogen. Prior to reduction the catalyst may optionally be treated with a chlorine or chloride stream.

20 Claims, No Drawings

PROCESS FOR PREPARING A HYDROCARBON CONVERSION CATALYST

FIELD OF THE INVENTION

This invention relates to a process for preparing a catalyst. The process involves the use of a chelating ligand to chelate at least one Group VIII metal.

BACKGROUND OF THE INVENTION

Catalyst containing Group VIII metals plus modifiers such as alkali metals, tin, germanium, lead, indium, gallium, etc. are well known in the art. For example, U.S. Pat. No. 4,914,075 discloses a dehydrogenation catalyst comprising a Group VIII metal component, an alkali or alkaline earth metal component and a component selected from tin, germanium, lead, indium, gallium, thallium or mixtures thereof. This catalyst is prepared by impregnating the support with the desired components. It is also known that chelating ligands can be used to impregnate metals onto a support. For example, U.S. Pat. No. 4,719,196 discloses preparing a catalyst using a solution containing ethylene diaminetetraacetic acid (EDTA), a noble metal and ammonia.

Applicants have developed a process for preparing catalysts which involves the use of a chelating ligand to simultaneously impregnate a Group VIII metal and a promoter metal. The process involves preparing a solution containing a chelating ligand such as EDTA and a promoter metal. This solution is heated and then mixed with a solution containing a Group VIII metal compound and the resultant mixed solution aged. This aged solution is now used to impregnate a refractory oxide support such as θ-alumina, followed by calcination and reduction to provide the desired catalyst.

SUMMARY OF THE INVENTION

This invention relates to a process for preparing a catalyst. The catalyst comprises a Group VIII metal and a modifier metal dispersed on a solid refractory oxide support. Accordingly, one embodiment of the invention comprises a process of:

a) mixing a first and a second aqueous solution to give a mixed solution, the first solution containing a chelating agent and at least one promoter metal salt, said first solution having been heated to a temperature from about 80° C. to about its boring point, the second solution containing at least one Group VIII metal compound;

b) ageing the mixed solution for a time of about 5 minutes to about 4 hours at a temperature of about 40° C. to about 100° C.;

c) impregnating said aged mixed solution onto a solid refractory oxide support to give an impregnated solid support;

d) calcining the impregnated solid support at a temperature of about 300° C. to about 850° C. for a time of about 10 minutes to about 8 hours to give a calcined catalyst; and e) reducing the calcined catalyst at a temperature of about 300° C. to about 850° C. for a time of about 30 minutes to about 8 hours, thereby providing said catalyst.

In another embodiment the catalyst from the process described above is treated with a stream of hydrogen chloride/chlorine at a temperature of about 300° C. to about 850° C. for a time of about 30 minutes to about 8 hours.

In a further embodiment, aluminum chloride may also be deposited on said catalyst.

These and other embodiments and objects will become more apparent after a more detailed description of the invention.

DETAILED DESCRIPTION OF THE INVENTION

As stated, the present invention relates to a process for preparing a catalyst. The catalyst comprises a solid refractory oxide support having dispersed thereon at least one Group VIH metal and optionally a modifier metal. The support can be any of a number of well known supports in the art including aluminas, silica/alumina, silica, titania, zirconia, and zeolites. The aluminas which can be used as support include gamma alumina, theta alumina, delta alumina, and alpha alumina with gamma and theta alumina being preferred. Included among the aluminas are aluminas which contain modifiers such as tin, zirconium, titanium and phosphate. The zeolites which can be used include: faujasites, zeolite beta, L-zeolite, ZSM-5, ZSM-8, ZSM-11, ZSM-12 and ZSM-35. The supports can be formed in any desired shape such as spheres, pills, cakes, extrudates, powders, granules, etc. and they may be utilized in any particular size. A preferred shape is spherical with a preferred particle size of about 1.59 millimeters in diameter, though particles as small as 0.79 millimeters and smaller also may be utilized.

One way of preparing a spherical alumina support is by the well known oil drop method which is described in U.S. Pat. No. 2,620,314 which is incorporated by reference. The oil drop method comprises forming an aluminum hydrosol by any of the techniques taught in the art and preferably by reacting aluminum metal with hydrochloric acid; combining the hydrosol with a suitable gelling agent; and dropping the resultant mixture into an oil bath maintained at elevated temperatures. The droplets of the mixture remain in the oil bath until they set and form hydrogel spheres. The spheres are then continuously withdrawn from the oil bath and typically subjected to specific ageing and drying treatments in oil and ammoniacal solutions to further improve their physical characteristics. The resulting aged and gelled spheres are then washed and dried at a relatively low temperature of about 80° C. to 260° C. and then calcined at a temperature of about 455° to 705° C. for a period of about 1 to about 20 hours. This treatment effects conversion of the hydrogel to the corresponding crystalline gamma alumina. If theta alumina is desired then the hydrogel spheres are calcined at a temperature of about 950° C. to about 1100° C.

The Group VIII metal or metals are dispersed onto the desired support as follows. First, an aqueous solution of a chelating ligand and at least one metal promoter salt is prepared. The chelating ligands which can be used in the process of this invention include amino acids which upon decomposing do not leave detrimental components on the support, e.g., sulfur. Specific examples of these amino acids include ethylenediaminetetraacetic acid, nitrilotriacetic acid, N-methylaminodiacetic acid, iminodiacetic acid, glycine, alanine, sarcosine, α-aminoisobutyric acid, N,N-dimethylglycine, α, β-diaminopropionate, aspartate, glutamate, histidine, and methionine.

Another necessary component of this first solution is a salt of a metal promoter. The metal promoter is selected from the group consisting of alkali and alkali earth metals. Examples of the salts of these promoter metals which can be used include potassium hydroxide, lithium hydroxide, sodium hydroxide, cesium hydroxide, magnesium hydroxide, etc.

The resultant solution is heated to a temperature from about 80° to its boiling point and preferably from 90° C. to about 102° C. The ratio of chelating ligand to the metal salt will vary from about 1 to about 8 and preferably from about 1.5 to about 4.

This first solution is now mixed with a second aqueous solution containing at least one Group VIII metal compound. Of the Group VIII metals which can be dispersed on the desired support, preferred metals are rhodium, palladium, platinum, nickel, cobalt and iron, with rhodium, palladium and platinum more preferred and platinum being most preferred. Illustrative of the Group VIII metal compounds which can be used in the process of this invention are chloroplatinic acid, palladic acid, tetraamine platinum chloride, tetraamine palladium chloride, bromoplatinic acid, rhodium chloride, ruthenium chloride, gallium nitrate, nickel chloride, nickel nitrate, cobalt nitrate, iron nitrate and iron chloride.

Mixing of the first and second solutions results in the formation of a complex between the Group VIII metal and the chelating ligand. The metal promoter may also be part of the complex. In order to form the complex, the ratio of chelating ligand to Group VIII metal varies from about 0.5 to about 30 and preferably from about 5 to about 13. The ratio depends on the concentration of promoter metal and Group VIII metal, with higher ratios desirable for higher concentrations of metals. The concentration of the Group VIII metal and promoter metal can vary considerably, but is usually chosen to give a concentration on the support in terms of weight percent of the support (as the metal) from about 0.2 to about 1 wt. % and from about 0.5 to about 3 wt. %, respectively.

The first solution described above may also contain a basic compound selected from the group consisting of ammonium hydroxide and quaternary ammonium compounds having the formula $NR_1R_2R_3R_4{}^+X^-$ where $R_1$, $R_2$, $R_3$, $R_4$ are each methyl, ethyl, propyl, butyl or t-butyl and X is hydroxide. The purpose of adding one or more of these basic compounds is to adjust the pH of the solution in order to vary the distribution of the metals. That is, in some cases it may be desirable to have a uniform distribution of the metals whereas in other cases a greater concentration on the surface may be desirable. Further, the distribution of the Group VIII metal may be different from the distribution of the promoter metal.

Without wishing to be bound by any one theory, it appears that there is a relationship between the isoelectric point (IEP) of the support and the pH of the impregnating solution. Thus, if the IEP is high, say 8, and the pH is low (1–2), then strong bonding or chemisorption may result in surface impregnation of the metal. By increasing the pH to 6–9, a substantially uniform distribution will be obtained. Similarly if both the IEP and pH are low then uniform distribution of the metals will result.

After obtaining the mixed solution, it is aged for a time of about 5 minutes to about 4 hours at a temperature of about 40° C. to about 100° C. The aged mixed solution is now used to deposit the metals onto the support by means well known in the art. Examples of said means include spray impregnation and evaporative impregnation. Spray impregnation involves taking a small volume of the mixed solution and spraying it over the support while the support is moving. When the spraying is over, the wetted support can be transferred to other apparatus for drying or finishing steps.

One particular method of evaporative impregnation involves the use of a steam-jacketed rotary dryer. In this method the support is immersed in the impregnating solution which has been placed in the dryer and the support is tumbled by the rotating motion of the dryer. Evaporation of the solution in contact with the rambling support is expedited by applying steam to the dryer jacket. The impregnated support is then dried at a temperature of about 60° C. to about 300° C. and then calcined at a temperature of about 300° C. to about 850° C. for a time of about 30 minutes to about 8 hours to give the calcined catalyst. Finally, the calcined catalyst is reduced by heating the catalyst under a reducing atmosphere, preferably dry hydrogen, at a temperature of about 300° C. to about 850° C. for a time of about 30 minutes to about 8 hours. This ensures that the Group VIII metal is in the metallic or zerovalent state.

An optional step in the process of this invention involves oxychlorination of the reduced catalyst described above. If such a step is desired, the catalyst is placed in a reactor and a gaseous stream containing chloride or chlorine is flowed over the catalyst at a flow rate of about 2 lb/hr to about 40 lb/hr, at a temperature of about 300° C. to about 850° C. for a time of about 10 minutes to about 6 hours. The gaseous stream can be a hydrogen chloride/chlorine stream, a water/HCl stream, a water/$Cl_2$ stream or a chlorine stream. The purpose of this step is to pro-ride optimum dispersion of the Group VIII and provide a certain amount of chloride on the final catalyst.

In addition to the catalytic components described above, other components may be added to the catalyst. For example, a second modifier metal selected from the group consisting of tin, germanium, lead, indium, gallium, thallium, and mixtures thereof may be added to the catalyst. This second modifier metal either can be added to the support during the preparation of the support, for example, by adding a solution of the metal compound to the hydrosol or it may be impregnated onto the support either before or after the impregnation with the Group VIII metal. Impregnation onto the support is carried out in a manner similar to that described above for the Group VIII metal.

If the catalyst is to be used for alkylation, then the catalyst will also contain a metal halide having Friedel-Crafts activity. Alkylation here refers to alkylation of C2–C6 olefins with alkanes in the 4–6 carbon range. This type of alkylation is usually referred to as motor fuel alkylation. This metal halide is deposited onto the catalyst after the catalyst has been calcined, optionally oxychlorinated and reduced. Among the metals which have FriedelCrafts activity are included aluminum, zirconium, tin, tantalum, titanium, gallium, antimony, and mixtures thereof. Preferred metals are aluminum, gallium, boron and mixtures thereof. Suitable halides are the fluorides, chlorides, and bromides. Representative of such metal halides include aluminum chloride, aluminum bromide, ferric chloride, ferric bromide, zirconium chloride, zirconium bromide, boron trifluoride, titanium tetrachloride, gallium chloride, tin tetrachloride, antimony fluoride, tantalum chloride, tantalum fluoride, and so forth. Of these metal halides the aluminum halides are preferred, especially aluminum chloride. Except for boron trifluoride, the chlorides are generally the preferable halides.

These metal halides are reacted with bound hydroxyls of the support. Therefore, for this type of alkylation catalyst it is necessary that the support have bound hyroxyls. The reaction between the metal halides and the bound surface hydroxyl groups of the support is readily accomplished by, for example, sublimation or distillation of the metal halide onto the surface of the particles of the support. The reaction is attended by the elimination of between about 0.5 and 2.0 moles of hydrogen halide per mole of metal halide adsorbed thereon. The reaction temperature will depend upon such variables as the reactivity of the metal halides and its sublimation temperature or boiling point, where the metal halide is reacted in the gas phase, as well as on the nature of the support. For example, using aluminum chloride and alumina as our specific examples reaction readily occurs within the range between about 190° C. through 600° C.

The amount of metal halide which is reacted with the bound surface hydroxyl groups of the support is generally given in terms of the weight percent of the Friedel-Crafts metal on the composite. This amount will vary with the support used, the relative number of bound surface hydroxyls of the support (which may be related to the particular oxide phase utilized), the specific Friedel-Crafts metal halide employed, as well as the particular procedure used to effect reaction between the Friedel-Crafts type metal halide and the bound surface hydroxyl. As a rough rule of thumb for aluminum chloride on alumina, as an example, the amount of aluminum chloride reacted expressed as weight percent aluminum in the final composite ranges from about 0.1 up to about 2.5%, with the level being a function primarily of the number of bound surface hydroxyl groups on the support.

The various catalysts prepared by the process of this invention are useful for a number of hydrocarbon conversion processes. For example, catalysts containing a Group VIII metal, especially platinum, and a first modifier metal, especially potassium, and a second modifier metal, especially tin, find uses as a dehydrogenation catalyst. Dehydrogenation of hydrocarbons involves contacting the catalyst with a dehydrogenatable hydrocarbon in a dehydrogenation zone maintained at dehydrogenation conditions. This contacting may be accomplished using a fixed catalyst bed system, a moving catalyst bed system, a fluidized bed system, or in a batch type system, with a fixed bed system being preferred. The hydrocarbons which can be dehydrogenated include dehydrogenatable hydrocarbons having from 2 to 30 or more carbon atoms including paraffins, alkyl aromatics, naphthenes, and olefins. Especially preferred dehydrogenatable hydrocarbons are the C2–C6 paraffins and primarily propane and butanes.

Dehydrogenation conditions include a temperature from about 400° C. to about 900° C., a pressure from about 0.01 to 10 atmospheres absolute and a liquid hourly space velocity (LHSV) from about 0.1 to 100 $hr^{-1}$. Other conditions and general considerations for carrying out a dehydrogenation process are well known in the art and are set forth, for example, in U.S. Pat. No. 4,914,075 which is incorporated by reference.

As described above, with the addition of a metal halide function, the catalyst of this invention can also be used for motor fuel alkylation. Motor fuel alkylation is carried out by taking a feedstock mixture of alkanes and alkenes and reacting it with the desired catalyst at alkylation conditions. Alkylation conditions include a temperature as low as −10° C. and as high as 100° C. depending upon the particular feedstock used and the nature of the catalyst. Temperatures between about 10° C. and about 50° C. are preferred. The reaction is carried out under a pressure sufficient to maintain the reactant in a liquid phase. The alkylation reaction zone normally uses a bed of the desired catalyst with the liquid phase reactant mixture being flowed through it at a liquid hourly space velocity of about 0.1 to about 5.0 $hr^{-1}$.

The following examples are presented in illustration of this invention and are not intended as undue limitations on the generally broad scope of the invention as set out in the appended claims.

EXAMPLE 1

A solution was prepared by combining in a flask 262.5 g of deionized water, 22.3 g of a potassium hydroxide solution (39.5% KOH) and 11.6 g of EDTA. This solution was heated to boiling and then transferred to a rotary evaporator which was controlled at 70° C. To the evaporator there was added a second solution containing 79.1 g of deionized water and 86 g of a solution containing chloroplatinic acid (2.92% Pt). The mixed solution was aged in the evaporator for 45 minutes.

To the aged solution there were added 283.5 g of gamma alumina spheres which contained 0.3 weight percent tin and were prepared as described in U.S. Pat. No. 4,914,075 (Example 1). The temperature was raised to 100° C. and the support rolled for 5 hours.

Next the impregnated support was heated to a temperature of 565° C. in dry air. When the temperature was reached, an air stream containing HCl and $Cl_2$ was flowed through the catalyst for 6 hours.

Finally, the catalyst was reduced by flowing pure hydrogen over the catalyst at a temperature of 562° C. for 2½ hours.

Analysis of the catalyst showed it to contain 0.75 wt. % Pt and 2.2 wt. % K. The platinum was evenly distributed throughout the support while the potassium had a slight gradient from the surface toward the interior (higher at the surface). This catalyst was identified as catalyst A.

EXAMPLE 2

A solution was prepared by combining in a flask 276.7 g of deionized water, 8.1 g of a potassium hydroxide solution (39.5% KOH) and 4.2 g of EDTA. This solution was heated to boiling and then transferred to a rotary evaporator which was controlled at 70° C. To the evaporator there was added a second solution containing 102.7 g of deionized water and 62.4 g of a solution containing chloroplatinic acid (2.92% Pt). The mixed solution was aged in the evaporator for 45 minutes.

To the aged solution there were added 310.5 g of theta alumina spheres which contained 0.3 weight percent tin and were prepared by first preparing gamma alumina spheres (plus Sn) as described in U.S. Pat. No. 4,914,075 (Example 1) and then calcining the support to a temperature of 565° C. for 2 hours. The temperature was raised to 100° C. and the support rolled for 5 hours.

Next the impregnated support was heated to a temperature of 565° C. in dry air. When the temperature was reached, an air stream containing HCl and $Cl_2$ was flowed through the catalyst for 6 hours.

Finally, the catalyst was reduced by flowing pure hydrogen over the catalyst at a temperature of 562° C. for 2½ hours.

Analysis of the catalyst showed it to contain 0.60 wt. % Pt and 0.73 wt. % K. This catalyst was identified as catalyst B. The catalyst was found to have the platinum evenly distributed, while the potassium was concentrated on the surface.

EXAMPLE 3

A solution was prepared by combining in a flask 276.8 g of deionized water, 7.9 g of a potassium hydroxide solution (39.5% KOH), 4.17 g of EDTA, and 4.0 g of tetramethylammonium hydroxide. This solution was heated to boiling and then transferred to a rotary evaporator which was controlled at 70° C. To the evaporator there was added a second solution containing 102.34 g of deionized water and 62.8 g of a solution containing chloroplatinic acid (2.92% Pt). The mixed solution was aged in the evaporator for 45 minutes.

To the aged solution there were added 310.5 g of theta alumina spheres which contained 0.3 weight percent tin and were prepared by first preparing gamma alumina spheres (plus Sn) as described in U.S. Pat. No. 4,914,075 (Example 1) and then calcining the support to a temperature of 1037° C. for about 2 hours. The temperature was raised to 100° C. and the support rolled for 5 hours.

Next the impregnated support was heated to a temperature of 565° C. in dry air. When the temperature was reached, an air stream containing HCl and $Cl_2$ was flowed through the catalyst for 6 hours.

Finally, the catalyst was reduced by flowing pure hydrogen over the catalyst at a temperature of 562° C. for 2½ hours.

Analysis of the catalyst showed it to contain 0.6 wt. % Pt and 0.7 wt. % K. Both the platinum and potassium were evenly distributed throughout the support. This catalyst was identified as catalyst C.

EXAMPLE 4

Catalysts A, B and C were tested for dehydrogenation activity as follows. In a vertical reactor there were placed 20 cc of the catalyst which was heated to about 532° C. Through the reactor there was flowed a feedstream consisting of isobutane and hydrogen at a $H_2$/HC ratio of 1.0 mol/mol and at a liquid hourly space velocity of 20 $hr^{-1}$. Conversion is measured versus time on stream. The results from this test are presented in the table below.

TABLE

| Catalyst I.D. | Conversion | | Selectivity | |
| --- | --- | --- | --- | --- |
| | Initial | Final | Initial | Final |
| A | 36 | 31 | 92 | 92 |
| B | 41 | 35 | 92.5 | 94 |
| C | 41 | 35 | 9 | 95 |

The data indicate that catalyst C with both the platinum and potassium evenly distributed has the best conversion and selectivity.

We claim as our invention:

1. A process for preparing a catalyst comprising a Group VIII metal and a promoter metal dispersed on a solid refractory oxide support, the process comprising;

a) mixing a first and a second aqueous solution to give a mixed solution, the first solution containing a chelating agent and at least one promoter metal salt, said first solution having been heated to a temperature from about 80° C. to about its boiling point, the second solution containing at least one Group VIII metal compound;

b) ageing the mixed solution for a time of about 5 minutes to about 4 hours at a temperature of about 40° C. to about 100° C.;

c) impregnating said aged mixed solution onto a solid refractory oxide support to give an impregnated solid support;

d) calcining the impregnated solid support at a temperature of about 300° C. to about 850° C. for a time of about 10 minutes to about 8 hours to give a calcined catalyst; and e) reducing the calcined catalyst at a temperature of about 300° C. to about 850° C. for a time of about 30 minutes to about 8 hours, thereby providing said catalyst.

2. The process of claim 1 where the promoter metal is selected from the group consisting of an alkali metal salt or alkali earth metal salt.

3. The process of claim 2 where the alkali metal is potassium.

4. The process of claim 1 where the Group VIII metal is selected from the group consisting of platinum, palladium, rhodium, ruthenium, cobalt, nickel, and iron.

5. The process of claim 4 where the Group VIII metal is platinum.

6. The process of claim 1 further characterized in that the first solution contains a basic compound selected from the group consisting of ammonium hydroxide and quaternary ammonium compounds having the formula $NR_1R_2R_3R_4^+X^-$ where $R_1, R_2, R_3, R_4$ are each methyl, ethyl, propyl, butyl or t-butyl and X is hydroxide.

7. The process of claim 1 further characterized in that after step (d), the catalyst is treated with a stream selected from the group consisting of $HCl/Cl_2$, water/HCl, water/$Cl_2$ and $Cl_2$ at a rate of 2 lb/hr to about 40 lb/hr, a temperature of about 300° C. to about 850° C. for a time of about 10 minutes to about 6 hours.

8. The process of claim 1 further characterized in that after step(e) a metal halide having Friedel-Crafts activity is deposited onto the surface of the support by reacting the metal halide with bound surface hyroxyls on the support.

9. The process of claim 8 where the metal halide is a halide of aluminum, gallium, boron and mixtures thereof.

10. The process of claim 9 where the metal halide is aluminum chloride.

11. The process of claim 7 further characterized in that a metal halide having Friedel-Crafts activity is deposited onto the surface.

12. The process of claim 11 where the metal halide is a halide of aluminum, gallium, boron and mixtures thereof.

13. The process of claim 12 where the metal halide is aluminum chloride.

14. The process of claim 1 where the chelating agent and promoter metal salt are present in a ratio of about 1 to about 8.

15. The process of claim 14 where the chelating agent and promoter metal salt are present in a ratio of about 1.5 to about 4.

16. The process of claim 1 further characterized in that the refractory oxide support contains a modifier metal selected from the group consisting of tin, germanium, lead, indium, gallium, thallium and mixtures thereof.

17. The process of claim 1 where the chelating agent is selected from the group consisting of ethylenediaminetetraacetic acid, nitrilotriacetic acid, N-methylaminodiacetic acid, iminodiacetic acid, glycine, alanine, sarcosine, α-aminoisobutyric acid, N,N-dimethylglycine, α,β-diaminopropionate, aspartate, glutamate, histidine and methionine.

18. The process of claim 17 where the chelating agent is ethylenediaminetetraacetic acid.

19. The process of claim 1 where the solid refractory oxide support is selected from the group consisting of alumina, silica/alumina, silica, titania, zirconia and zeolites.

20. The process of claim 19 where the solid refractory oxide support is alumina.

* * * * *